United States Patent [19]
Johns et al.

[11] Patent Number: 5,724,560
[45] Date of Patent: Mar. 3, 1998

[54] DISPLAY GRAPHICS ADAPTER FOR PROCESSING DIFFERENT PIXEL SIZES IN A WINDOWING SYSTEM

[75] Inventors: Charles Ray Johns; John Thomas Roberson, both of Austin, Tex.

[73] Assignee: International Business Machines Corporation, Armonk, N.Y.

[21] Appl. No.: 572,697

[22] Filed: Dec. 14, 1995

[51] Int. Cl.⁶ .................................................. G06T 1/60
[52] U.S. Cl. .................. 395/510; 395/503; 395/511; 395/122; 245/187
[58] Field of Search .................... 395/162–166, 395/122, 501–503, 507–511, 520, 521, 526; 345/185, 189, 187, 186, 191

[56] References Cited

U.S. PATENT DOCUMENTS

| | | | |
|---|---|---|---|
| 5,036,315 | 7/1991 | Gurley | 345/119 |
| 5,146,211 | 9/1992 | Adams et al. | 345/145 |
| 5,241,658 | 8/1993 | Masterson et al. | 395/162 |
| 5,257,348 | 10/1993 | Roskowski et al. | 395/157 |
| 5,321,809 | 6/1994 | Aranda | 395/164 |

OTHER PUBLICATIONS

IBM Technical Disclosure Bulletin, vol. 28, No. 11 Apr. 1986, Video Data Path In Color Raster Displays With Variable Pixel Data Structure, pp. 4890–4893.

IBM Technical Disclosure Bulletin, vol. 37 No. 06A Jun. 1994, Packet Logic For An Advanced Rendering Engine, pp. 473–474.

*Primary Examiner*—Kee M. Tung
*Attorney, Agent, or Firm*—Volel Emile

[57] ABSTRACT

A graphics adapter having a processor for processing pixel data is provided. The processor transfers the processed data to the graphics memory in sets of slices of pixel data where each transfer provides several slices, each slice being from a unique pixel. In an alternative embodiment, the storage of the processed data is accomplished within a plurality of memory banks, each of the memory banks being used to store slices of consecutive pixels. The invention further provides for concurrently displaying images having different color depths. This is achieved by a method of organizing data of different pixel depths such that they can be interpreted correctly. Furthermore, the invention provides for double buffering the processed data to get a smooth transition from one image to another.

18 Claims, 7 Drawing Sheets

| | TRANSFER FOR PC CLASS ADAPTER (PRIOR ART) 64 BIT BUS | | | |
|---|---|---|---|---|
| PIXEL DEPTH | CYCLE 1 | CYCLE 2 | CYCLE 3 | CYCLE 4 |
| 32 Bits | R₀G₀B₀α₀  R₁G₁B₁α₁ | R₂G₂B₂α₂  R₃G₃B₃α₃ | R₄G₄B₄α₄  R₅G₅B₅α₅ | R₆G₆B₆α₆  R₇G₇B₇α₇ |
| 24 Bits | R₀G₀B₀  R₁G₁B₁ | R₂G₂B₂  R₃G₃B₃ | R₄G₄B₄  R₅G₅B₅ | R₆G₆B₆  R₇G₇B₇ |
| 16 Bits | U₀L₀ U₁L₁ U₂L₂ U₃L₃ | U₄L₄ U₅L₅ U₆L₆ U₇L₇ | U₈L₈ U₉L₉ U₁₀L₁₀ U₁₁L₁₁ | U₁₂L₁₂ U₁₃L₁₃ U₁₄L₁₄ U₁₅L₁₅ |

| | TRANSFER FOR WORKSTATION CLASS ADAPTER (PRIOR ART) 64 BIT BUS | | | |
|---|---|---|---|---|
| PIXEL DEPTH | CYCLE 1 | CYCLE 2 | CYCLE 3 | CYCLE 4 |
| 32 Bits | R₀G₀B₀α₀  R₁G₁B₁α₁ | R₂G₂B₂α₂  R₃G₃B₃α₃ | R₄G₄B₄α₄  R₅G₅B₅α₅ | R₆G₆B₆α₆  R₇G₇B₇α₇ |
| 24 Bits | R₀G₀B₀  R₁G₁B₁ | R₂G₂B₂  R₃G₃B₃ | R₄G₄B₄  R₅G₅B₅ | R₆G₆B₆  R₇G₇B₇ |
| 16 Bits | U₀L₀ U₁L₁ | U₂L₂ U₃L₃ | U₄L₄ U₅L₅ | U₆L₆ U₇L₇ |

| | TRANSFER FOR PRESENT INVENTION | | | |
|---|---|---|---|---|
| PIXEL DEPTH | CYCLE 1 | CYCLE 2 | CYCLE 3 | CYCLE 4 |
| 32 Bits | R₀ - R₇ | G₀ - G₇ | B₀ - B₇ | α₀ - α₇ |
| 24 Bits | R₀ - R₇ | G₀ - G₇ | B₀ - B₇ | R₈ - R₁₅ |
| 16 Bits | U₀ - U₇ | L₀ - L₇ | U₈ - U₁₅ | L₈ - L₁₅ |

FIG. 10

DISPLAY GRAPHICS ADAPTER FOR PROCESSING DIFFERENT PIXEL SIZES IN A WINDOWING SYSTEM

BACKGROUND OF THE INVENTION

1. Field of the Invention

The present invention relates generally to computer graphics systems and more particularly to a display graphics adapter having an enhanced performance for handling pixels of different bit sizes for concurrently displayed windows.

2. Description of the Related Art

In the computer graphics field, many types of graphics system are used. However, for the purpose of this invention, the graphics systems can be categorized into one of two types of systems based on their functionality requirements. These two categories are the personal computer (PC) graphics systems and the workstation graphics systems. In the PC graphics systems, the ability to concurrently display images on a screen using pixels having different color depths (e.g., pixels having different numbers of bits) is not supported. That is, if the screen is configured for a certain resolution using a certain color depth, all displayed pixels must be of this color depth. For example, if the system is configured to display images using 8-bit color depth on a 1280×1024 screen, then only this color depth may be used in displaying the images. If an image is displayed using 16-bit or 24-bit color depth instead of the 8-bit color depth, the resolution of the displayed image will be greatly reduced as the memory of the system will not be large enough to contain the total number of bits required to display the image.

As is well known in the art, pixel color data are processed in a graphics display adapter by a processor and sent to a display memory or frame buffer before being displayed on the screen. To transfer the processed pixel data from the processor to the frame buffer, a bus interface is used. If the bus interface is 32-bit wide, then the pixel data will be sent to the memory as illustrated in FIG. 1. That is, depending on whether the image is rendered using 8-bit, 16-bit or 24-bit color depth, four 8-bit color depth, two 16-bit color depth or one 24-bit color depth may be sent to the memory in a given memory cycle as shown in rows 10, 20 and 30, respectively. From rows 10 and 20, it can be seen that the entire bus width is used when the image is rendered using 8-bit or 16-bit color depth. When, however, the image is rendered using 24-bit color depth, only three-quarter (¾) of the available bus width is used. Thus, there is a waste of one-quarter (¼) of the bus width as illustrated by the "X" in row 30.

Unlike the PC graphics systems, the workstation graphics system does support the ability to concurrently display images using different color depths on a screen without any loss of resolution. This is typically accomplished by the use of a window identification tag (wid) associated with each pixel. The "wid" describes pixel characteristics, such as the color depth. As a result, a first window may be used to display a three-dimensional rendering of a simulation model with 24-bit color depth, a second window may be used to display a two-dimensional video game with 16-bit color depth and a third window may be used to display a text editor using 8-bit color depth. Since any pixel location may be of any color depth, every pixel location must support all pixel color depths.

To facilitate the update of these pixels, the width of the bus interface is typically chosen to accommodate the largest allowable color depth. For example in FIG. 2, the bus is shown to be 120-bit wide and to accommodate five 24-bit, five 16-bit or five 8-bit color depths as shown in rows 60, 50 and 40, respectively. When an image is rendered using pixels of 24-bit color depth, the entire width of the bus is used. When, however, an image is rendered using pixels of smaller color depths, part of the bandwidth of the bus is squandered as illustrated by the "X's" in rows 40 and 50.

Therefore, there is a need in the art for a graphics display adapter that allows a graphics system to simultaneously display multiple images, each using pixels of different color depths, without a loss of image resolution while making use of the entire width of the bus interface.

SUMMARY OF THE INVENTION

The need in the art is addressed by the present invention. The present invention provides a graphics adapter having a processor for processing pixel data. The processor provides a series of pixels (picture elements) that collectively make an image for display. Each pixel includes a number of slices. The processor is connected to a bus that transfers a number of pixel slices during each bus cycle where each pixel slice transferred during a cycle is from a unique and different pixel. Upon receipt, the pixel slices are reassembled into pixels.

In one embodiment, the storage of the received pixels is accomplished within a plurality of memory banks, each of the memory banks being used to store n bits of data.

The invention further provides for concurrently displaying images having different pixel color depths while using the entire width of the bus. This is achieved by having a mechanism for determining the pixel's color depth when displaying the image.

Additionally, the invention provides for double buffering of the processed data. Double buffering is often used in the field of animation to get a smooth transition from one image to another.

BRIEF DESCRIPTION OF THE DRAWING

FIG. 10 is a diagram illustrating the transfer of pixel data for a PC class adapter, a workstation class adapter and the present invention.

DESCRIPTION OF THE INVENTION

Figure 3:
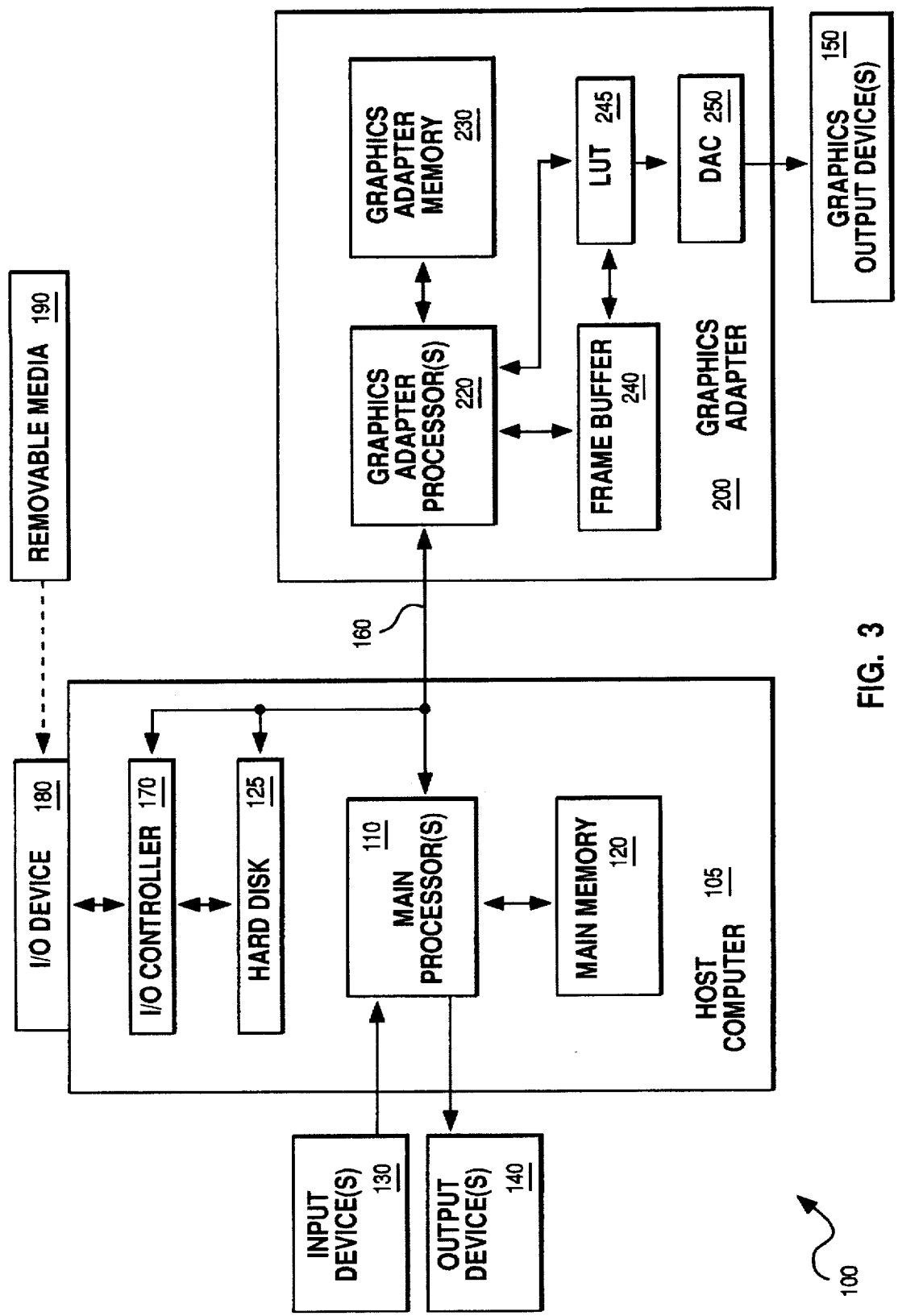
FIG. 3 is a diagram of a typical digital computer utilized by a preferred embodiment of the invention.

FIG. 3 is a block diagram of a digital computer 100 utilized by a preferred embodiment of the invention. The computer includes main processor(s) 110 coupled to a memory 120 and a hard disk 125 in computer box 105 with input device(s) 130 and output device(s) 140 attached. Input device(s) 130 may include a keyboard, mouse, tablet or other types of input devices. Output device(s) 140 may include a text monitor, plotter or other types of output devices. Computer readable removable media 190, such as a magnetic diskette or a compact disc, may be inserted into an input/output device 180, such as a disk drive or a CD-ROM (compact disc—read only memory) drive. Data is read from or written to the removable media by the I/O device under the control of the I/O device controller 170. The I/O device controller communicates with the main processor through bus 160. Main memory 120, hard disk 125 and removable media 190 are all referred to as memory for storing data for processing by main processor(s) 110.

The main processor is also coupled to graphics output device(s) 150 such as a graphics display through a graphics adapter 200. Graphics adapter 200 receives instructions regarding graphics from main processor(s) 110 on bus 160. The graphics adapter then executes those instructions with graphics adapter processor(s) 220 coupled to a graphics adapter memory 230. The graphics processors in the graphics adapter then execute those instructions and update frame buffer(s) 240 based on those instructions. Frame buffer(s) 240 includes data for every pixel to be displayed on the graphics output device with look up table (LUT) 245 containing a palette of colors referenced by the data in the frame buffer. A DAC (digital-to-analog converter) 250 converts the digital data stored in the frame buffer into RGB signals to be provided to the graphics display 150 thereby displaying the desired graphics output from the main processor. Note that LUT 245 and DAC 250 comprise a RAMDAC (random-access-memory digital-to-analog converter).

Figure 4:
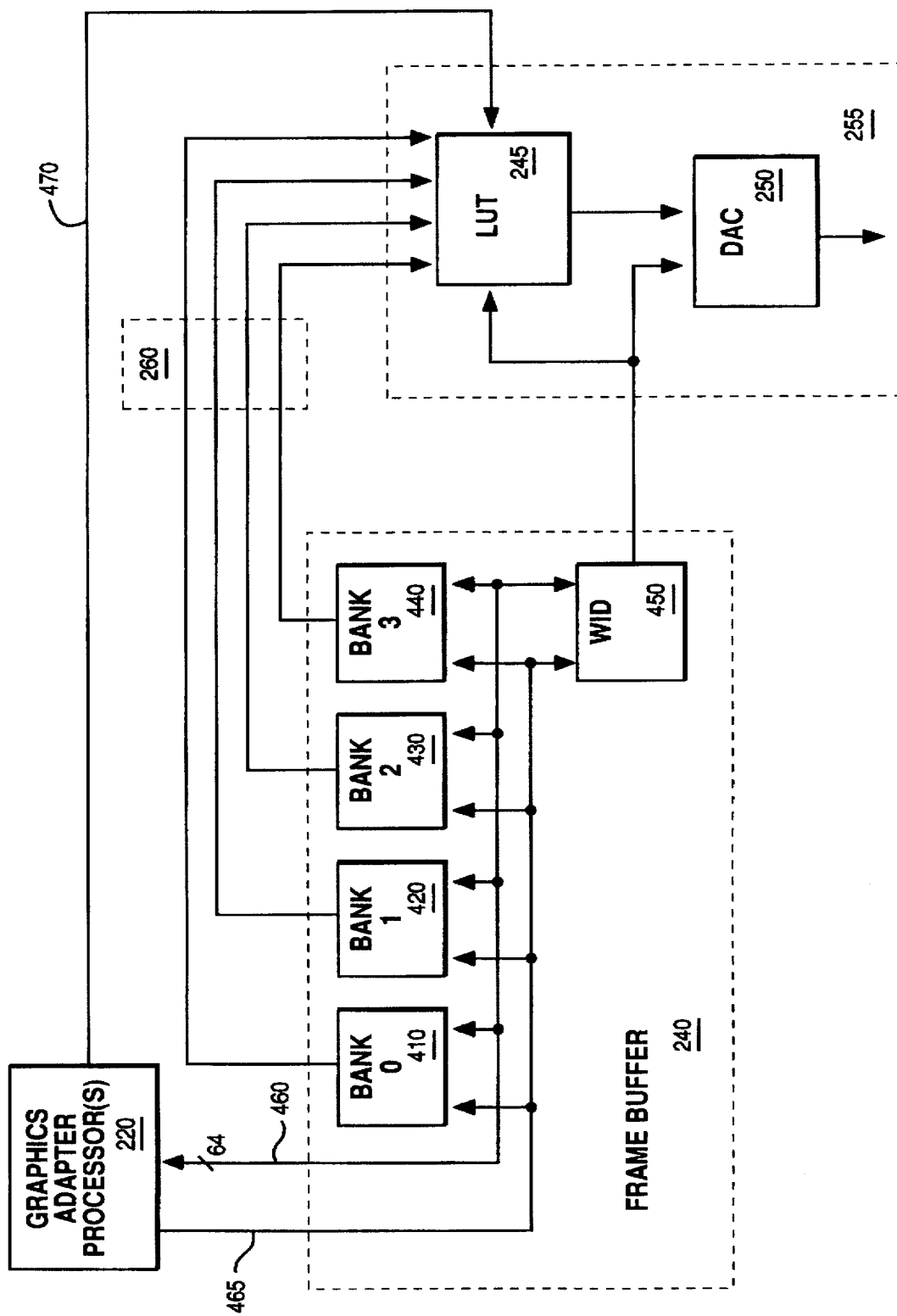
FIG. 4 is a detailed block diagram of portions of graphics adapter described herein with reference to FIG. 3.

The present invention is implemented within graphics adapter 200. FIG. 4 is a detailed block diagram of portions of graphics adapter 200 described above with reference to FIG. 3. These portions of graphics adapter 200 comprise graphics processor 220, frame buffer memory 240 and RAMDAC 255. The frame buffer 240 includes memory banks 410,420, 430 and 440, referred to herein as memory banks 0, 1, 2, and 3, respectively. Also included in the frame buffer is a window identifier memory (wid) 450. The graphics processor 220 is connected to the memory banks 0, 1, 2 and 3 and the wid 450 of the frame buffer 240 by interface bus 460 and pixel address bus 465. The memory banks are used for storing pixel data to be displayed on the screen. The pixel data are updated by the graphics processor 220 via bus interface 460 based on addresses provided across pixel address bus 465.

Figure 5:
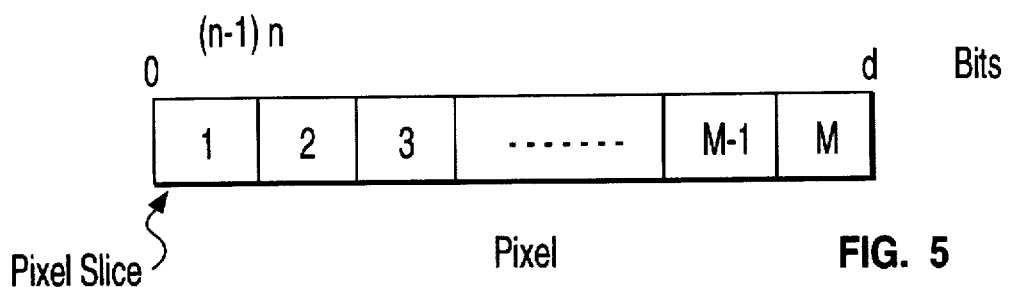
FIG. 5 is a diagram of a single pixel, illustrating the slices of bits of the pixel.

In the present invention, the pixel's color depth (d) is divided into M pixel subsets or slices of n bits. These slices are typically of equal size but may be of different sizes. FIG. 5 depicts the subsetting or slicing of the pixel's color data. Common slices from m consecutive pixels are gathered together by the processor 220 and transferred to the frame buffer 240 in a single transfer or memory cycle. The slice depth (n) is typically the minimum displayable pixel depth but may be of any width. The number of slices grouped together (m) by the bus interface 460 is typically chosen such that the number of bits in a slice (n) multiplied by the number of slices grouped together (m) equals the width of the bus interface 460 (w). (i.e. w=n * m). The bus width may be fixed and the other parameters varied. The slicing and grouping of consecutive pixels described above require M memory transfers or cycles on the bus interface 460 to update m consecutive pixels of color depth d. The result of the time multiplexing larger pixel depths (i.e. slicing and grouping of consecutive pixels) provides the ability to fully utilize the available bandwidth of the bus interface 460 for pixel update.

This concept described in the previous paragraph will be further explained using an example of the preferred embodiment. In the following example the width of the bus interface 460 is 64(w=64), the number of bits in a pixel slice is eight (n=8), and the number of slices grouped together by the processor 220 is 8(m=8). The example includes pixels of color depth 8=, 16-, 24-, and 32-bits (i.e. d=8,16,24,32). These values imply that the number of memory transfers to store eight pixels of color depth 8-, 16-, 24-, and 32-bits is 1, 2, 3, 4 respectively (M=1,2,3,4).

Figure 6:
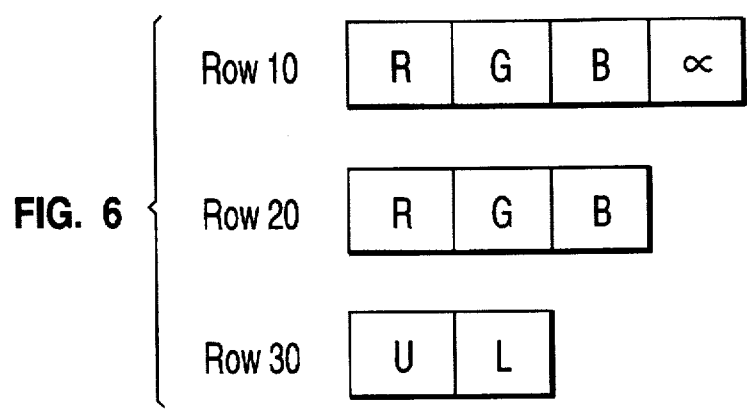
FIG. 6 is a diagram of three different pixel depths.

FIG. 6 depicts the slicing of the different color depths. In row 10, and 20, R represents the first (or Red) slice, G represents the second (or Green) slice and B represents the third (or Blue) slice of a 32- and 24-bit pixel depth. In row 10, the $\alpha$ represents the fourth slice of a 32-bit pixel depth. The $\alpha$ value is typically used to represent a pixel's transparency, although at times these bits are used to provide other information such as stencil, color, etc. In this example the slice lines up with the color bands or channels but this does not have to be the case.

Figure 7:
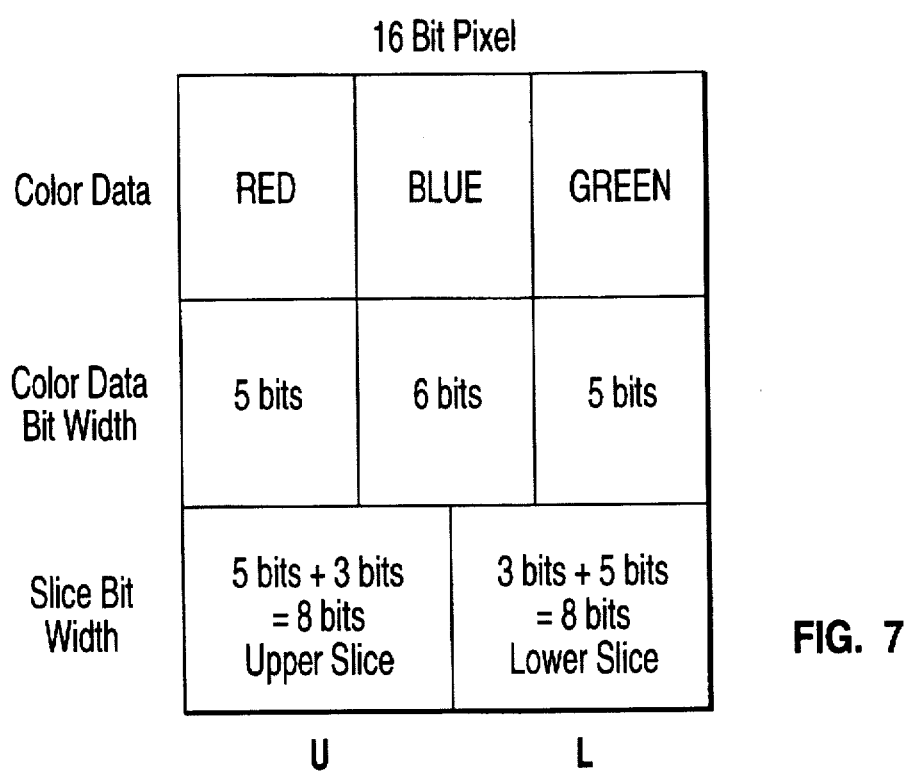
FIG. 7 is a diagram of a 16 bit pixel divided into upper and lower slices.

In row 30, the U and L represents the upper, or first, slice and the lower, or second, slice of a 16-bit pixel. This row also provides an example of a pixel which slices do not line up on a color band or channel. Two slices (U and L) are required to represent a 16-bit pixel as illustrated in FIG. 7. Three slices (R, G, & B) are required to represent a 24-bit pixel. Four slices are required to represent a 32-bit pixel.

Figure 8:
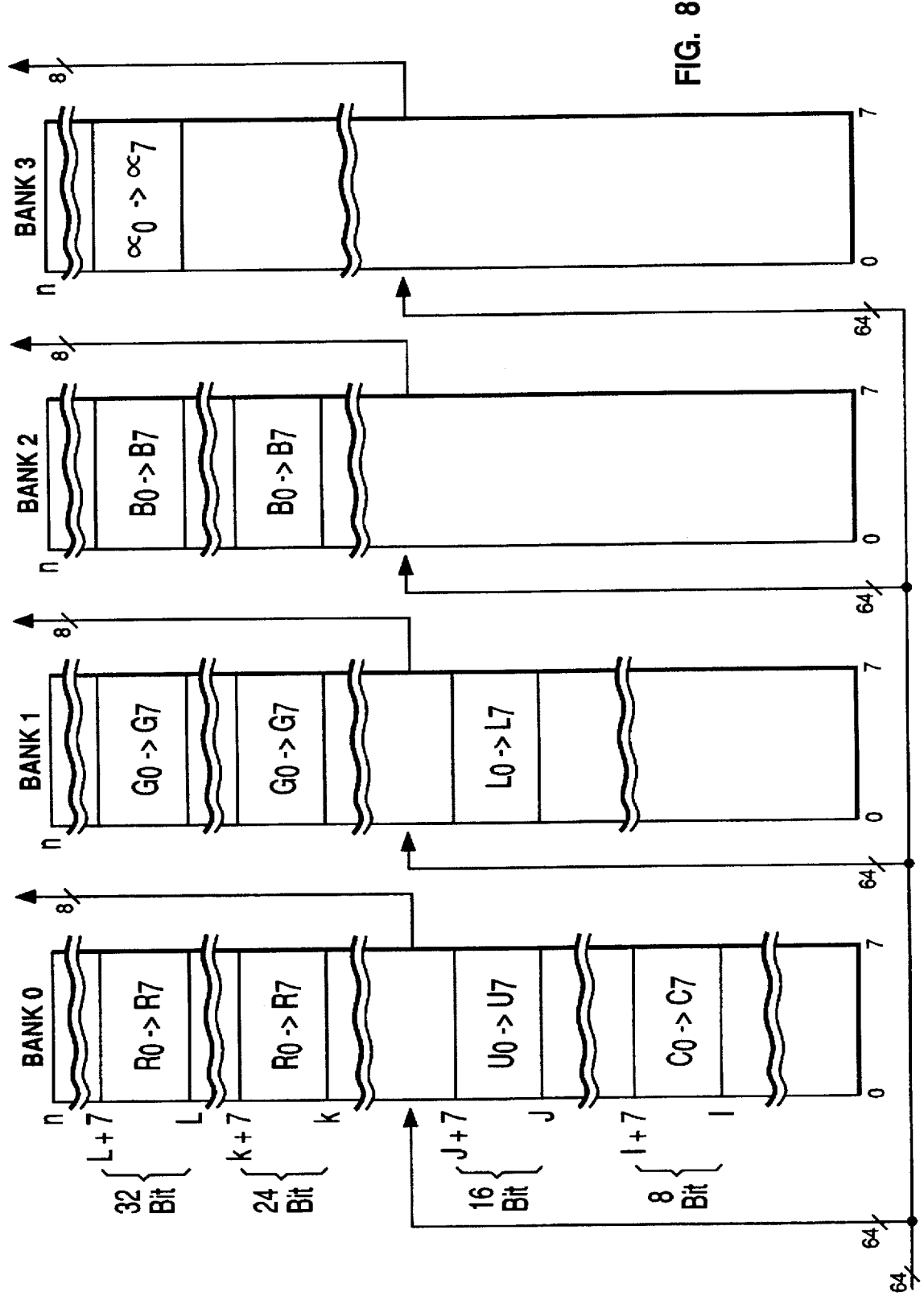
FIG. 8 depicts how pixel data are stored within the frame buffer memory banks for 32-bit, 24-bit, 16-bit and 8-bit color depths according to the preferred embodiment of the invention.

FIG. 8 depicts how the pixel data are stored within the frame buffer memory banks 0, 1, 2, and 3 for 32-bit, 24-bit, 16-bit and 8-bit color depths. The first and second rows show the red, green and blue slices of a 32-bit and a 24-bit pixel stored in memory banks 0, 1 and 2 (i.e., $R_0$–$R_7$, $G_0$–$G_7$ and $B_0$–$B_7$). In addition, the first row contains the a slice of the 32-bit pixel (i.e., $\alpha_0$–$\alpha_7$, in memory bank 3). The $\alpha$ values are typically used to represent pixel's transparency, although at times they are used to provide other information such as stencil plane, color, intensity etc. Pixel's transparency enables a first object located beneath a second object to be seen through the second object. The $\alpha$ values are typically used in workstation graphics systems and not in PC graphics systems. The third row illustrates the upper or first and lower or second slice of a 16-bit pixel stored in memory banks 0 and I (i.e., $U_0$–$U_7$ and $L_0$–$L_7$). (This row can be used as an example of pixels whose slices do not line up on a color band or channel.) The fourth row depicts the single slice of an 8-bit pixel in memory bank 0 (i.e., $C_0$–$C_7$). In this case, only one slice is required to represent the 8-bit pixel since the slice width (n) is equal to the color depth (d) of the pixel.

Therefore, pixel data are stored in the frame buffer 240 in sets of eight bits of red, green and blue instead of the conventional manner of storing concatenated red, green and blue values of each pixel (i.e., $R_0G_0B_0$, $R_1$ $G_1$ $B_1$). This is made possible through time multiplexing larger pixels (e.g., slicing and grouping consecutive pixels). This, in turn, allows the entire width of the bus interface 460 to be used.

Figure 1:
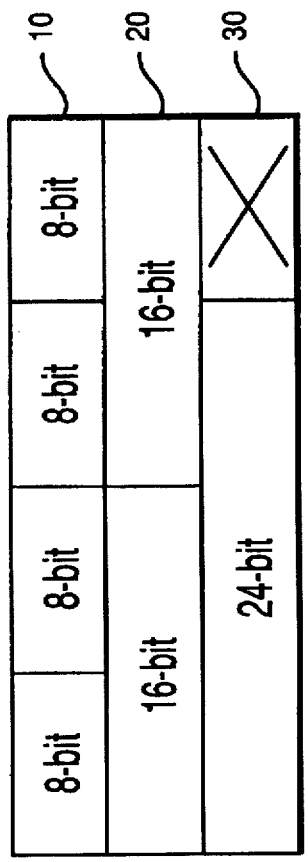
FIG. 1 depicts the usage of a personal computer graphics system interface bus interfacing a processor to a frame buffer.

Hence, the one-quarter of the width of the interface bus (or 8-bit width) squandered when rendering 24-bit color depth in the PC graphics systems shown in FIG. 1 is effectively used to update the next slice or eight bits of data. Therefore, eight 24-bit pixels are updated using the 64-bit interface bus 460 three times instead of the customary four times of the PC graphics systems (i.e., eight slices or two and two-thirds 24-bit pixels are updated in the frame buffer at each memory cycle as opposed to two pixels per cycle of the PC graphics systems). Consequently, a higher performance is exhibited when the graphics adapter of the present invention is used in a PC graphics system environment to display an image using 24-bit color depth.

Figure 2:
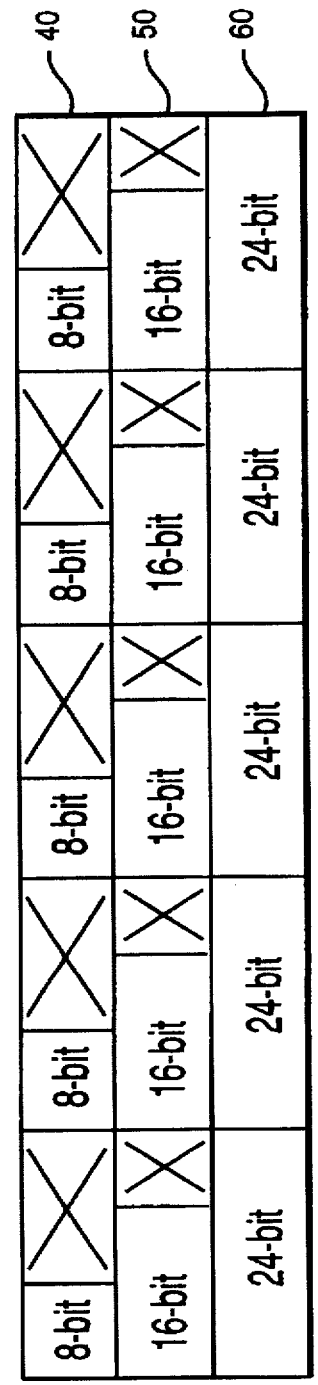
FIG. 2 depicts the usage of a workstation graphics system interface bus interfacing a processor to a frame buffer.

An increase in performance is also exhibited when the invention is used in a workstation graphics system environment. For example, the waste of bus width shown in FIG. 2, in the case of 16-bit and 8-bit color depths, are eliminated. This allows for the use of a bus having a smaller width while yet providing α channels for the a data.

The present invention may also provide savings in the frame buffer memory. For example, if 24-bit pixels are stored in the frame buffer according to the manner in which they were sent from the graphics processor (i.e., as shown in FIG. 1 ), the result may be a twenty-five percent (25%) loss of storage efficiency. Depending on the resolution desired and the memory granularity used for the frame buffer, this inefficiency may result in additional memory requirements for the system. For example, in a typical PC graphics adapter two (2) megabytes of storage are required to support a 1280×1024 resolution. In addition, eight (8) megabytes are required to support pixels of 24-bit depth. A graphics system using an adapter of the present invention only requires six (6) megabytes of memory to support pixels of 24-bit depth and 1280×1024 resolution.

In the preferred embodiment, the frame buffer 240 is able to store at least 1280×1024 32-bit data (e.g., 24-bit of pixel data and 8-bit of α data). Note, however, that a frame buffer capable of containing 1280×1024 24-bit pixel data may be used in PC graphics systems since α data are not provided in these systems. In addition, note that alternative embodiments can include other interface bus widths such as 32 bit or 128 bit busses. Returning to FIG. 4, the graphics processor 220, the memory banks 0, 1, 2 and 3 and the wid 450 are all connected to RAMDAC 255. The graphics processor 220 updates the palette of colors in the LUT 245 via control bus 470. The pixel data stored in memory banks 0, 1, 2 and 3 are transferred to RAMDAC 255 in parallel over memory bus 260. Here, however, the RGB colors of each pixel are provided to RAMDAC 255 in concatenated fashion (i.e., $R_0G_0B_0$, $R_1G_1B_1$).

The wid 450 and the frame buffer 240 are identically mapped. That is, each location in the wid 450 corresponds to a pixel location in the frame buffer 240. The wid 450 generates a code that is used by RAMDAC 255 to determine the attributes of the corresponding pixel, such as the pixel's color depth, displayable buffer in case of double buffering etc. The RAMDAC 255 uses these attributes to select the memory bank from which to obtain the data for a particular pixel and how to interpret the data. For example, the RAMDAC 255 may obtain data from memory bank 0 at location 410 for an 8-bit pixel, or from memory banks 0 and 1 at locations 410 and 420, respectively, for a 16-bit pixel, or from memory banks 0, 1 and 2, at locations 410, 420 and 430, respectively for a 24-bit pixel etc. Therefore, the RAMDAC 255 is able to use the correct number of bits for each pixel when interpreting the pixel data and to send the data to the correct window. Consequently, concurrent images of different color depths may be displayed on a screen without any loss of resolution.

The memory bus 260 should be wide enough to accommodate the largest supported pixel depth. In the preferred embodiment, four pixels are sent to the RAMDAC 255 at a time. Hence, memory bus 260 has a 128-bit width to accommodate the four 32-bit pixel data of the workstation graphics systems. In the case of PC graphics systems, since the α values are not used, memory bus 260 may have a 96-bit it width for transferring four 24-bit pixels to RAMDAC 255.

Figure 9:
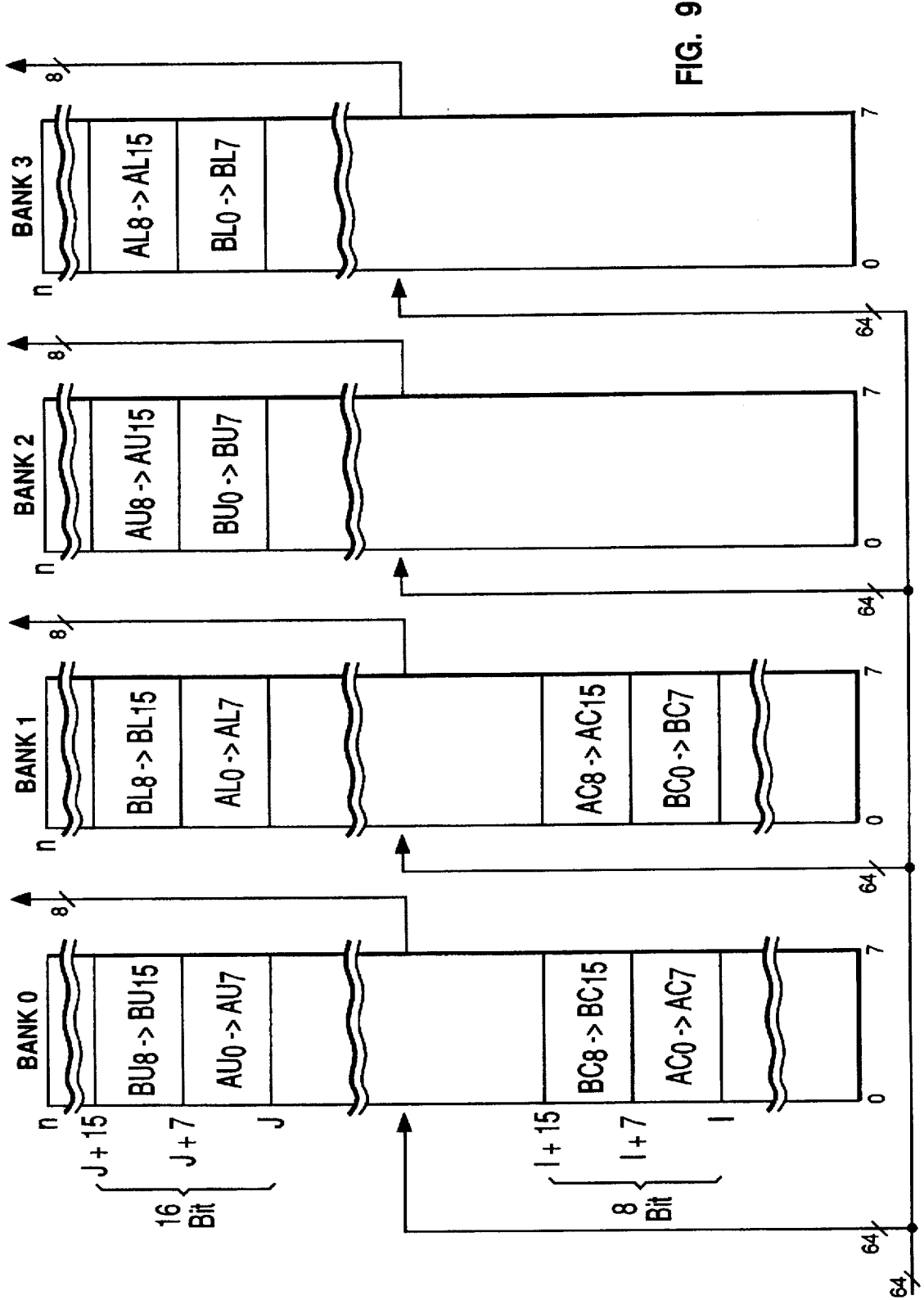
FIG. 9 depicts how the data for each pixel are stored within the frame buffer memory banks when 16-bit and 8-bit color depths are double buffered according to a preferred embodiment of the invention.

FIG. 9 depicts how the data for each pixel are stored within the frame buffer memory banks 0, 1, 2 and 3 when 16-bit and 8-bit color depth are double buffered according to a preferred embodiment of the invention. As the name suggests, double buffering requires two buffers of equal size to be used. Double buffering can be used to get a smooth transition from one image to another. This can be used for aesthetic reasons especially in the field of animation. The smoothness in transitioning from one buffer to another is achieved by updating pixel data in a second buffer while displaying data from a first buffer. Once the pixel data have been updated in the second buffer, the RAMDAC 255 can be commanded by wid 450 to stop displaying pixel data from the first buffer and to begin displaying data from the second buffer. The command to switch from one buffer to another may be achieved through toggling one bit in the RAMDAC 255. Note that since the switch from the one buffer to the other is instantaneous, pixel data from both buffers have to be presented to the RAMDAC 255 at any one time on memory bus 260.

$Au_i$ and $Al_i$ (where i=0 to 15) refer to the "upper" and "lower" slices of a 16-bit pixel stored in buffer A. Similarly, $Bu_i$ and $Bl_i$ (where i=0 to 15) refer to the "upper" and "lower" slices of a 16-bit pixel stored in buffer B. $AC_i$ and $BC_i$ (where i =0 to 15) refer to an 8-bit pixel stored in buffers A and B, respectively. When at least two banks of memory are present in the frame buffer 240, an 8-bit double buffering can be accommodated as illustrated in the third and fourth row of FIG. 6. When at least four banks of memory are present in the frame buffer 240, a 16-bit double buffering can be accommodated. The update of a pixel's color depth data in memory banks 0, 1, 2 and 3 is accomplished as explained above (i.e., in sets or multiple of eight bits at every memory bus cycle). However, the destination of the data in the memory banks 0, 1, 2 and 3 is dependent upon which buffer (A or B) is being updated as illustrated in the figure. FIG. 9 also shows the location of buffers A and B as being dependent on the address of the slices. For example, $AC_0$–$AC_7$ reside in bank 0 while $AC_8$–$AC_{15}$ reside in bank 1 etc. The use of both memory banks allow for interleaving accesses to the memory banks. But note that buffer A or B could reside in memory bank 0 for all the slices. This concept of double buffering can be extended to support 24-bit as well as 32-bit double buffering.

FIG. 10 is a diagram depicting the transfer of pixel data for a PC class adapter, a workstation class adapter in the present invention. For a 32-bit transfer, the number of pixels transferred are the same for all three devices. However, it can be clearly seen that the specified data transferred by the present invention is unique compared to the PC class adapter and the workstation class adapter. For 24-bit pixel transfers, both the PC class adapter and the workstation class adapter transfer 8 pixels in 4 transfer cycles, whereas the present invention is able to transfer 8 pixels plus the red data for the next 8 pixels during the same 4 transfer cycles. This illustrates the increased efficiency of the present invention. For 16-bit pixels, both the PC class adapter and the present invention transfer the same number of pixels. However, the present invention is clearly superior by transferring 16 pixels as opposed to the 8-bit pixels transferred by the workstation class adapter.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A graphics adapter comprising:
   means for providing a plurality of pixels, each pixel containing a plurality of slices;
   means for gathering common slices from consecutive pixels of said plurality of pixels;
   means for transferring said gathered common slices in a single transfer cycle, each transferred slice being from a different one of said plurality of pixels; and
   means for receiving said slices and forming each of said different ones of said plurality of pixels from said transferred slices.

2. The graphics adapter of claim 1 wherein said forming means includes a plurality of memory banks for storing said pixels.

3. The graphics adapter of claim 2 further including means for interpreting pixel data of a first color depth and pixel data of a second color depth, said first color depth being different from said second color depth.

4. The graphics adapter of claim 3 further including means for concurrently displaying on a screen a first image having pixels of said first color depth and a second image having pixels of said second color depth.

5. The graphics adapter of claim 2 wherein said memory banks are used to double buffer a pixel's color depth data.

6. A graphics adapter comprising:
   means for providing a plurality of pixels, each pixel having d bits and containing a plurality of slices, each slice having n bits where d is greater than n;
   a data bus means for transferring w bits in parallel during a single bus cycle;
   means for transferring on said data bus means w/n slices in a single bus cycle (where w/n is an integer greater than 1), each transferred slice being from a different one of said plurality of pixels; and
   means for receiving said slices and forming each of said different ones of said plurality of pixels from said transferred slices.

7. A display apparatus comprising:
   a host computer;
   a graphics adapter coupled to said host computer including:
   means for providing a plurality of pixels, each pixel containing a plurality of slices;
   means for gathering common slices from consecutive pixels of said plurality of pixels;
   means for transferring said gathered common slices in a single transfer cycle, each transferred slice being from a different one of said plurality of pixels; and
   means for receiving said slices and forming each of said different ones of said plurality of pixels from said transferred slices
   means coupled to said forming means for displaying said pixel data.

8. The display apparatus of claim 7 wherein said forming means includes a plurality of memory banks to store said pixel data.

9. The display apparatus of claim 8 wherein said displaying means includes means for interpreting pixel data of a first color depth and pixel data of a second color depth, said first color depth being different from said second color depth.

10. The display apparatus of claim 9 further including means for concurrently displaying on a screen a first image having pixels of said first color depth and a second image having pixels said second color depth.

11. The display apparatus of claim 10 wherein a plurality of transfer cycles are required to transfer all of slices for an individual pixel.

12. The display apparatus of claim 7 wherein said plurality of memory banks are used to double buffer said pixel data.

13. A method of storing pixel data in a frame buffer comprising the steps of:
   providing a plurality of pixels, each pixel containing a plurality of slices:
   gathering common slices from consecutive pixels of said plurality of pixels;
   transferring a plurality of slices in a single transfer cycle, each transferred slice being from a different one of said plurality of pixels: and
   receiving said slices and forming each of said different ones of said plurality of pixels from said transferred slices.

14. The method of claim 13 wherein said step of storing includes the step of storing said pixels in a plurality of memory banks.

15. The method of claim 14 further including the step of interpreting pixel data of a first color depth and pixel data of a second color depth, said first color depth being different from said second color depth.

16. The method of claim 15 including the step of concurrently displaying on a screen a first image having pixels of said first color depth and a second image having pixels of said second color depth.

17. The method of claim 16 wherein a plurality of transfer cycles are required to transfer all of slices for an individual pixel.

18. The method of claim 13 wherein said step of storing comprises the step of double buffering said pixel data in said plurality of memory banks.

* * * * *